(No Model.)
J. McLAUGHLIN.
THILL COUPLING.
No. 284,750. Patented Sept. 11, 1883.
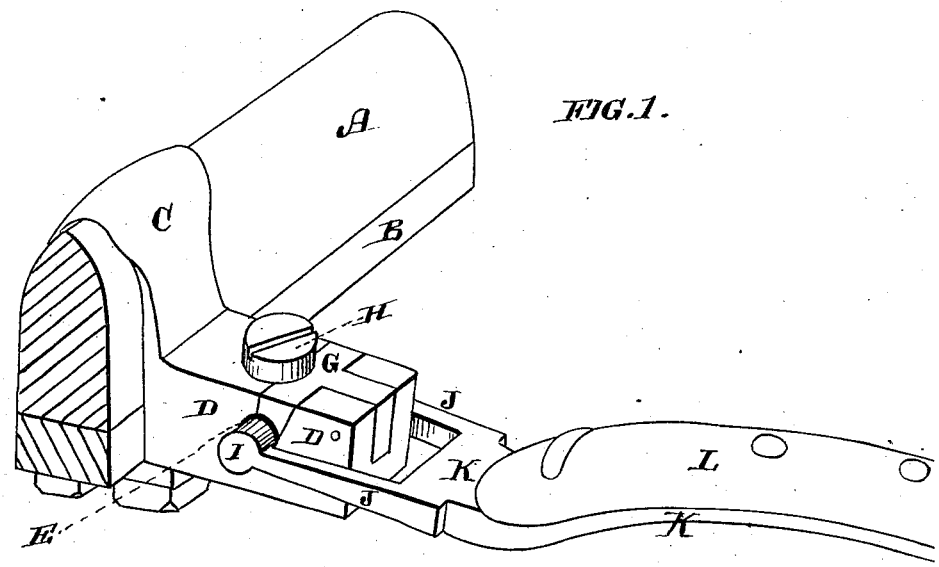
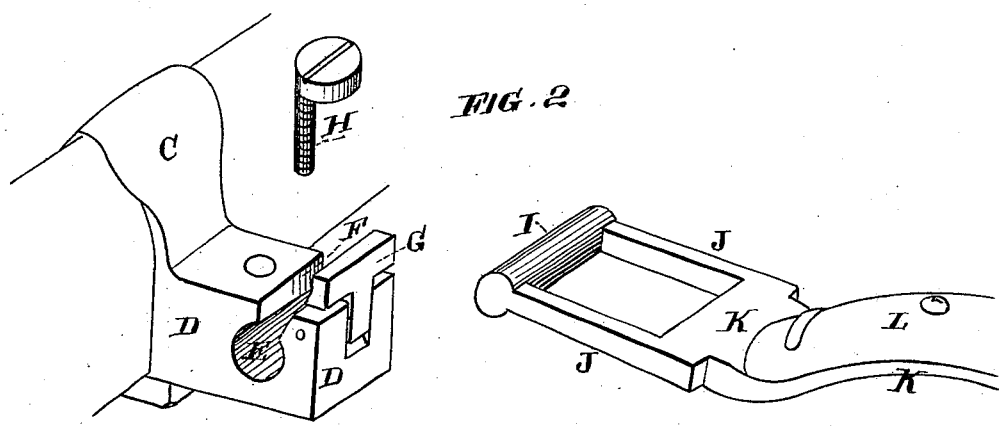
Witnesses,
Inventor,
John McLaughlin
By Dewey & Co
Attorneys.

UNITED STATES PATENT OFFICE.

JOHN McLAUGHLIN, OF SAN RAFAEL, CALIFORNIA.

THILL-COUPLING.

SPECIFICATION forming part of Letters Patent No. 284,750, dated September 11, 1883.

Application filed March 31, 1883. (No model.)

*To all whom it may concern:*

Be it known that I, JOHN McLAUGHLIN, of San Rafael, county of Marin, State of California, have invented an Improved Shaft-Coupling; and I hereby declare the following to be a full, clear, and exact description thereof.

My invention relates to certain improvements in couplings for connecting the shafts or poles to vehicles; and it consists of plates projecting from clips upon the front axle, and having slots adapted to receive the cross-bars of links which are rigidly fixed to the shafts.

The plates are also provided with locking devices to retain the connecting-links, all of which will be more fully explained by reference to the accompanying drawings, in which—

Figure 1 is a view of my coupling. Fig. 2 shows the parts detached.

A is a portion of the front axle of a vehicle. B is the axle-bed, and C is a clip uniting the two in the ordinary manner. From the front of the clip a plate or block, D, projects, having a hole, E, bored horizontally through it to receive the connecting bar or link from the shaft. A slot, F, is made in the top of the block, extending down into the hole E, and a block, G, is hinged to the front part of D, so as to fall into the slot and just fill it, or turn back and leave it open. Upon the opposite side of the slot from this hinged piece is a screw, H, having an eccentric or half-head. When this screw is turned in one direction, it leaves the hinged piece free to be turned back; but when turned in the opposite direction half a turn, it will project over the plate and prevent its being lifted.

The coupling-link I is a round bar, which unites the ends of two side pieces, J, these being a continuation of a plate, K, which is secured to the under part of the rear end of the shaft L. This round bar just fits the hole E, but is of larger diameter than the slot F, so that when once in the hole it cannot be lifted out. The side bars, J, are somewhat narrower, and when the shafts are lifted up until the sides J are in line with the slot F, the bar I will just slip through the hole E. The shafts may then be turned down again, when one of the side plates J will lie upon each side of the block D, the bar I passing through the hole in it. The hinged piece G may then be turned down, so as to fill the slot F and complete the inclosing of the bar I, after which the screw H is turned half round and locks it in place.

By this device the coupling or uncoupling of shafts or poles and vehicles is easily and quickly accomplished without removing nuts or bolts. The joint thus made is noiseless and works well.

I am aware that thill-couplings have heretofore been constructed with a hinged catch secured by a screw-bolt and nut; also, that thill-couplings have heretofore been devised in which the thill-iron is attached by being inserted laterally in a groove formed transversely in the block; but my invention is clearly distinguishable from such previous structures.

Having thus described my invention, what I claim as new, and desire to secure by Letters Patent, is—

In a thill-coupling, the combination, with a block, D, attached to the axle and provided with a transverse horizontal opening, E, a transverse vertical opening, F, a hinged piece, G, having a T end, and an eccentrically-headed screw-bolt, H, of the plate K, formed with the parallel arms J, and the transverse bar I, said arms being of less diameter than the bar, and the bar being of equal diameter with the horizontal opening, substantially as and for the purposes set forth.

In witness whereof I have hereunto set my hand.

JOHN McLAUGHLIN.

Witnesses:
S. H. NOURSE,
G. W. EMERSON.